(12) United States Patent
Turek et al.

(10) Patent No.: US 6,771,803 B1
(45) Date of Patent: Aug. 3, 2004

(54) METHOD AND APPARATUS FOR FITTING A SMOOTH BOUNDARY TO SEGMENTATION MASKS

(75) Inventors: Matthew W. Turek, Glenville, NY (US); Gopal B. Avinash, New Berlin, WI (US)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 581 days.

(21) Appl. No.: 09/718,708

(22) Filed: Nov. 22, 2000

(51) Int. Cl.$^7$ .................................................. G06K 9/00
(52) U.S. Cl. ...................................... 382/131; 382/173
(58) Field of Search ................................. 382/128, 131, 382/132, 133, 173, 174, 197, 199, 268, 269

(56) References Cited

U.S. PATENT DOCUMENTS

| | | | | |
|---|---|---|---|---|
| 5,457,754 A | * | 10/1995 | Han et al. ................... | 382/128 |
| 5,469,850 A | * | 11/1995 | Iizuka et al. ................ | 600/443 |
| 5,605,155 A | * | 2/1997 | Chalana et al. ............. | 660/443 |
| 5,797,396 A | * | 8/1998 | Geiser et al. ............... | 600/407 |
| 6,031,374 A | * | 2/2000 | Epstein et al. .............. | 324/306 |

OTHER PUBLICATIONS

Buller, V.G.M., van der Geest, R.J., Kool, M.D. van der Wall, E.E., de Roos, A. & Reiber, J.H.C. (1997, Sep.) Assessment of Regional Left Ventricular Wall Parameters from Short Axis Magnetic Resonance Imaging using a Three Dimensional Extension to the Improved Centerline Method, *Investigative Radiology, 32(9)* 529–539.

Caselles, V., Catte, F., Cool, T. & Dibos, F. (1993) A Geometric Model for Active Contours in Image Processing. *Numerische Mathematik., 66*, 1–31.

Chen, J.T.T. (1997) *Essential of Cardiac Imaging.* (Second Edition), Philadelphia PA: Lippincott–Raven Publishers.

Gardner, J.C., Heyano, S.L., Yaffe, L.G., von Ingersleben, G. & Chestnut, C.H. (1996). A Semi–automated Computerized System for Fracture Assessment of Spinal X–Ray Films. *Proceedings of The International Society for Optical Engineering. 2710*, 996–1008.

Goshtasby, A., & Turner, D.A. (1995, Mar.) Segmentation of Cardiac Cine MR Images for Extraction of Right and Left Ventricular Chambers. *IEEE Transactions on Medical, 14(1)*, 56–64.

Kimia, B.B., Tannenbaum, A., & Zucker, S.W. (Jan. 15, 1992) On the Evolution of Curves via a Function of Curvature 1. The Classical Case. *Mathematical Analysis and Applications 163(2)*, 438–458.

Malladi, R. Sethian, J., & Vemuri, B. (1995) Shape Modeling with Front Propagation: A Level Set Approach. *IEEE Transactions on Pattern Analysis and Machine Intelligence. 17*, 158–175.

(List continued on next page.)

*Primary Examiner*—Leo Boudreau
*Assistant Examiner*—Ryan J. Miller
(74) *Attorney, Agent, or Firm*—Quarles & Brady LLP

(57) ABSTRACT

A method and apparatus is provided for producing a smooth closed curve from a binary mask such as the type produced when segmenting various parts of a human body. Points defining the segmentation boundary are transformed into a set of polar coordinates. The set of coordinates is thresholded and averaged, and then smoothed using a window smoothing technique. The resulting boundary points are curve fit to produce the smooth closed curve.

11 Claims, 12 Drawing Sheets

OTHER PUBLICATIONS

McVeigh, E.R. & Guttman, M.A., (1992) Visualization and Analysis of Functional Cardiac MRI Data, *Proceedings of The International Society for Optical Engineering.* 2168.

O'Dell, W.G., Moore, C.C. Hunter, W.C., Zerhouni, E.A., McVeigh, E.R., (1994) Displacement Field fitting for Calculating 3D Myocardial Deformations from Tagged MR Images, [WWW document] URL http://prospero.bme.mri.jhu.edu/papers/wodell94_1/fieldfit_rad.html.

Osher, S.J., & Sethian, J.A. (1988) Fronts Propagation with Curvature Dependent Speed: Algorithms Based on Hamilton–Jacobi Formations. *Journal of Computational Physics.* 79 12–49.

Ranganath, S. (1995, Jun.). Contour Extraction from Cardiac MRI Studies Using Snakes. *IEEE Transactions on Medical Imaging, 14*(2) 328–338.

Sapiro, G. & Tannenbaum, A. (1993) On Invariant Curve Evolution and Image Analysis, *Indiana University Mathematics Journal; 42*(3), 985–1009.

Sethian, J.A. (1997, May–Jun.) Tracking Interfaces with Level Sets. *American Scientist., 85*, 254–263.

Van der Geest, R.J., de Roos, A., van der Wall, Ernst E., & Reiber, J.H.C. (1997) Quantitative Analysis of Cardiovascular MR Images., *International Journal of Cardiac Imaging; 13* 247–258.

van der Geest, R J., Buller, V.G.M., Jansen. E. Lamb, H.J., Baur, L.H.B., van der Wall, E.E., de Roos, A., & Reiber, J.H.C. (1997) Comparsion Between Manual and Semiautomated Analysis of Left Ventricular Volume Parameters from Short Axis MR Images. *Journal of Computer Assisted Tomography, 21*(5), 756–765.

Yezzi, A., Kichenassamy, S., Kumar, A., Oliver, P., & Tannenbaum, A. (1997, Apr.) A Geometric Snake Model for Segmentation of Medical Imagery. IEEE Transaction on Medical Imaging., 16, 199–209.

\* cited by examiner

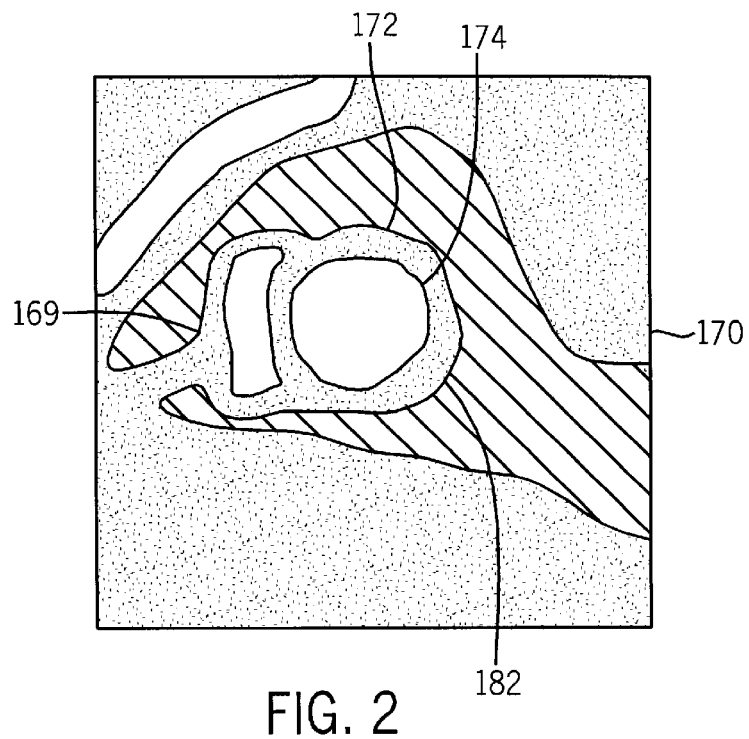
FIG. 2
| 238 | 240 | 236 |
|---|---|---|
| 1 | 1 | 1 |
| 1 | 0 | 1 |
| 1 | 1 | 1 |
FIG. 5
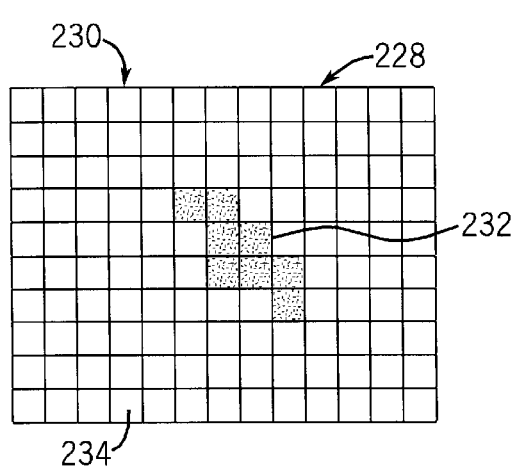
FIG. 6

METHOD AND APPARATUS FOR FITTING A SMOOTH BOUNDARY TO SEGMENTATION MASKS

BACKGROUND OF THE INVENTION

The present invention relates generally to segmentation masks resulting from nuclear magnetic resonance imaging and, in particular, relates to a method and apparatus for fitting a smooth boundary to a segmentation mask.

When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_t$. A signal is emitted by the excited spins after the excitation signal $B_1$ is terminated. This signal may be received and processed to form an image.

When utilizing these signals to produce images, magnetic field gradients ($G_x$ $G_y$ and $G_z$) are employed. Typically, the region to be imaged is scanned by a sequence of measurement cycles in which these gradients vary according to the particular localization method being used. The resulting set of received NMR signals are digitized and processed to reconstruct the image using one of many well-known reconstruction techniques.

The prognosis of patients with a wide variety of cardiac diseases, for example, has been closely linked to the performance of the heart as indicated by measurements such as wall thickening, wall motion, and myocardial mass. Accurate quantitative measures of regional contractile function could therefore have significant prognostic and therapeutic importance. For example, many patients with severe coronary artery disease may have normal regional and global left ventricular function at rest but have abnormalities induced by stress. In clinical practice, patients with coronary artery disease can be detected by stress echocardiography based on new functional deficits during stress. However, interobserver variability of this type of qualitative measure is an inherent limitation that could be improved with quantitative measures. Thus, there is a need for high quality quantitative measures of regional cardiac function.

Image data of the epicardial boundary, for example, is currently acquired by applying a specific sequence of RF pulses to yield a NMR signal that provides information pertaining to the tissue under test. A particular pulse sequence can therefore be applied to obtain an image of, for example, a cross-section of the left ventricle tissue.

Segmentation methods that are currently available include snake-based techniques such as that described by A. Yezzi, et al. "A Geometric Snake Model for Segmentation of Medical Imagery," IEEE Transaction on Medical Imaging, 16, 199–209 (April, 1997). Snakes, also known as active contours, have been used in an attempt to segment features of the left ventricle. Snakes are described by a parameterized curve whose evolution is determined by the minimization of an energy field. The equation of the energy field, as defined by J. C. Gardner et al. "A Semi-Automated Computerized System for Fracture Assessment of Spinal X-Ray Films," Proceedings of the International Society for Optical Engineering, 2710, 996–1008 (1996), is:

$$E[\vec{x}(s)] \equiv k \int_0^1 ds \left[ \frac{1}{2}\alpha\left(\frac{d\vec{x}}{ds}\right)^2 + \frac{1}{2}\beta\left(\frac{d^2\vec{x}}{ds^2}\right)^2 - \gamma H(\vec{x}(s)) \right] \quad (1)$$

where s is the parameterization variable, $\vec{x}$ is the parameterized curve, κ is the normalization constant, α is the $H(\vec{x})=|\vec{\nabla}/(\vec{x})|$ tension of the snake, β is the rigidity of the snake, γ controls the attraction to image features, and I is the pixel intensity of the image. H (x) refers to a function which defines the features that attract the snake algorithm to the boundary and, typically, is chosen to be the magnitude of the gradient of the image intensity.

Because the magnitude of the gradient is used to attract the algorithm to the boundary of the left ventricle, the snake does not work well where the boundary is defined by edges that are weak in intensity. In order for the snake algorithm to attach to a boundary, a user must intervene and supply a boundary condition to define the proximity of the boundary for the snake. This is undesirable because user may need to interact with the segmentation algorithm while the images are being processed.

Snake based techniques can be used, as described by Yezzi, to produce a geometric snake model having a stopping term and a constant inflation term added to the evolution equation. The resulting evolution equation of the Yezzi active contour model is:

$$\frac{\partial \Psi}{\partial t} = \phi \|\nabla \Psi\|(\kappa + v) + \nabla \phi * \nabla \Psi \quad (2)$$

where v is a constant inflation force, $$\kappa \equiv \text{div}\left(\frac{\nabla \psi}{\|\nabla \psi\|}\right)$$

the curvature of the level sets of $\psi(x, y, t)$, $\phi$ is a function dependent on the type of image and is a stopping term for the curve evolution. Snake based techniques are additionally unfavorable because they rely primarily on edge information only, and therefore are subject to greater error and generally lack robustness, particularly in a clinical setting. S. Ranganath attempted unsuccessfully to segment an epicardium using a snake, as described in "Contour Extraction from Cardiac MRI Studies Using Snakes," IEEE Transactions on Medical Imaging, 14(2), 328–338 (June, 1995).

Another such method is disclosed herein with reference to pending U.S. patent application Ser. No. 09/652,739, filed by the present assignee and entitled "Method and Apparatus for Segmentation of a Left Ventricular Epicardium." The disclosure of the referenced pending application is hereby incorporated by reference.

When segmenting a left ventricular epicardium, as well as other internal body parts, it is typical to represent the area of interest with a binary mask. Pixels inside the area of interest are marked "on" and pixels outside the area are marked "off." Many times it is of interest to show the boundary of an organ or region that has been segmented. Conventional segmentation operations have been unsuccessful in producing an accurate representation of the boundary between the organ to be segmented and its surroundings. What is therefore needed is a method and apparatus for transforming a segmentation mask into a smooth, closed contour that is representative of the body part under examination.

SUMMARY OF THE INVENTION

The present invention relates to a method and apparatus for fitting a smooth boundary curve to a segmented image of a human organ or tissue.

In accordance with a first aspect of the invention, boundary points of a mask produced using, for example, a magnetic resonance imaging system each are at least partially defined by a corresponding radius. The length of each radius is compared to a predetermined interval, and those falling outside of the interval are removed. The remaining radii define corresponding remaining boundary points of the image. Next, a moving window encapsulates a portion of the remaining radii, which are then examined to determine whether a given radius falls within a second predetermined interval. Those radii falling outside of the predetermined interval are adjusted such that the adjusted lengths fall within the interval. The remaining boundary points are then curve fit to produce a smooth and continuous contour.

BRIEF DESCRIPTION OF THE DRAWINGS

Reference is hereby made to the following figures in which like reference numerals correspond to like elements, and in which:

FIG. 2 is a schematic map corresponding generally to a nuclear magnetic resonance image of a chest cavity in accordance with the preferred embodiment;

FIG. 5 is a representation of a kernel used in combination with the dilation step in the process of FIG. 4;

FIG. 6 is a graphical representation of a blood pool mask in accordance with the preferred embodiment;

GENERAL DESCRIPTION OF A SEGMENTATION OPERATION

An epicardial detection process is performed on an acquired MR image by an image processor. Specifically, a blood pool mask is created and subsequently dilated to obtain an expanded, dilated, mask. Next, the blood pool mask is subtracted from the dilated mask to produce a boundary mask. The dilation process is repeated so as to produce a plurality of boundaries, which represent the radially outwardly advancing boundary of the dilated mask toward the epicardium during successive iterations. The mean and standard deviation of the resulting intensity values corresponding to the boundaries are calculated and stored in an array. The dilations repeat until the dilation boundary grows beyond the epicardium, and into the other areas surrounding the heart. As the boundary moves beyond the outer wall of the left ventricle, the boundary will encounter areas of vastly different pixel intensities due to the different tissue compositions of the regions beyond the heart. The behavior of the calculated standard deviation will reflect the boundary advancing from the endocardium to the epicardium and also will display predictable behavior when the boundary moves away from the epicardium into other areas surrounding the heart. The changes in standard deviation as each iteration is performed provides a relatively accurate approximation of the region containing the epicardial boundary. Finally, the process computes an intensity range for the mask, and an intensity map is created.

The next step is to generate an edge map for the intensity map by histogramming a gradient map of the image and discarding values in the gradient map that fall below a predetermined threshold. The gradient values which remain are defined as the edge map. Next, the edge map is subtracted from the intensity map. The intensity map with edge map removed is then altered to remove the blood pool as well as any additional islands in the image that might exist as the result of noise, for example, so as to produce a final classification map.

The mask for the blood pool is then used to determine an approximate location for the center of the left ventricle. To determine the boundary points of the epicardium, rays are cast outwardly from the center in search of a transition from a non-mask intensity value (indicative of the rays traversing the location formerly occupied by the blood pool) to a mask intensity value (indicative of the rays traversing the myocardium) and again to a non-mask value (indicative of the rays traversing the epicardium). Once the boundary is produced, a smoothing process is performed to create a smooth curve representing the epicardial boundary of the left ventricle.

DETAILED DESCRIPTION OF THE PREFERRED EMBODIMENT

Figure 1:
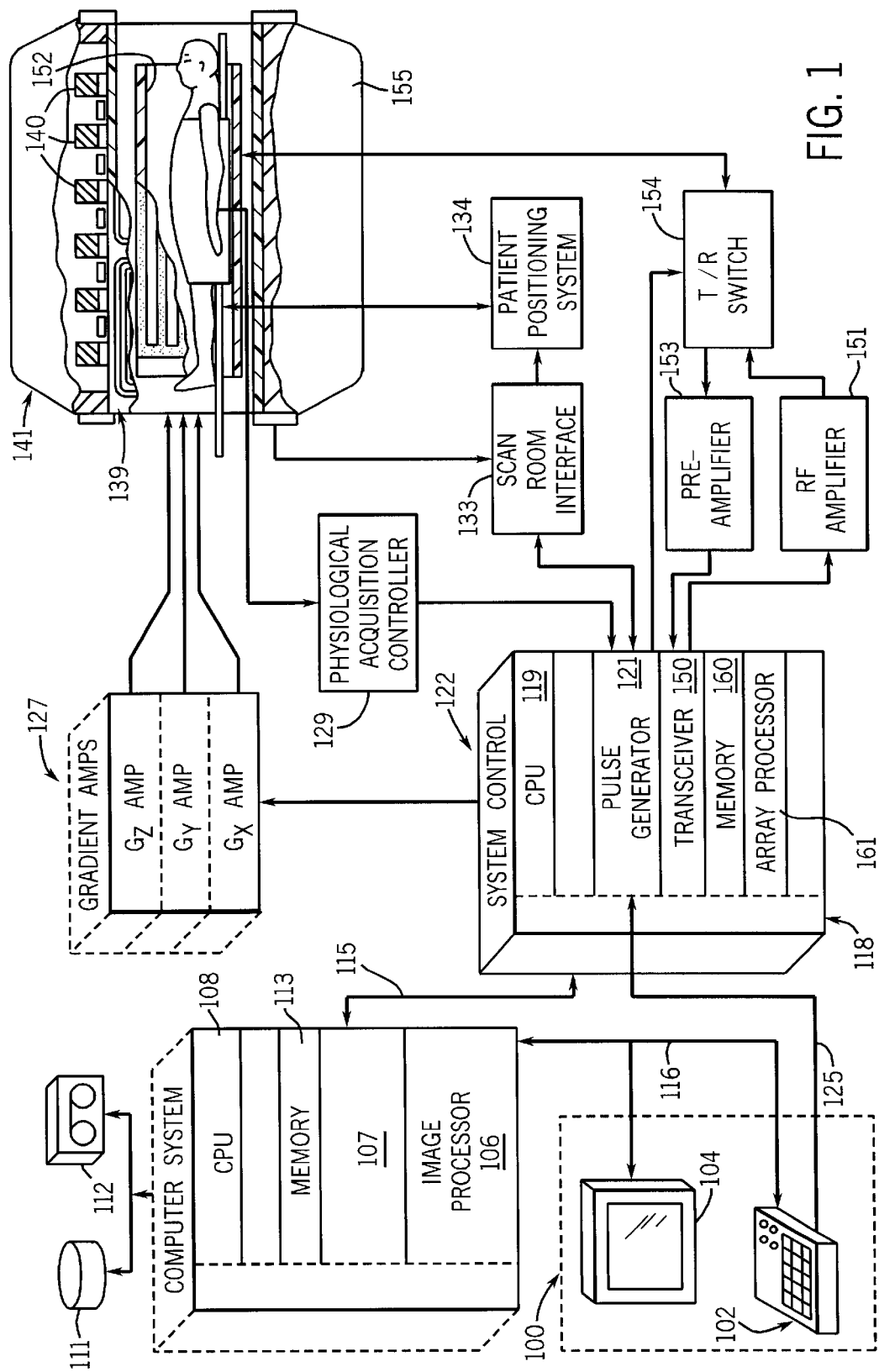
FIG. 1 is a block diagram of an MRI system which employs the preferred embodiment of the present invention.

Referring initially to FIG. 1, there is shown the major components of a preferred magnetic resonance imagine (MRI) system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane 118. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152. A transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. This image data is conveyed through the serial link 115 to the computer system 107 where it is stored in the disk memory 111. In response to commands received from the operator console 100, this image data may be archived on the tape drive 112, or it may be further processed by the image processor 106 and conveyed to the operator console 100 and presented on the display 104.

For a more detailed description of the transceiver 150, reference is made to U.S. Pat. Nos. 4,952,877 and 4,922,736, which are incorporated herein by reference.

The MRI system of FIG. 1 performs a series of suitable pulse sequences to collect sufficient NMR data so as to produce an image of the left ventricle, as is well known in the art. FIG. 2 illustrates a schematic representation of a typical chest cavity image identifying a human heart 169 having a left ventricle 172, a blood pool 174, and an epicardium 182. A lung field 170 surrounds or partially surrounds the heart 169.

Figure 3:
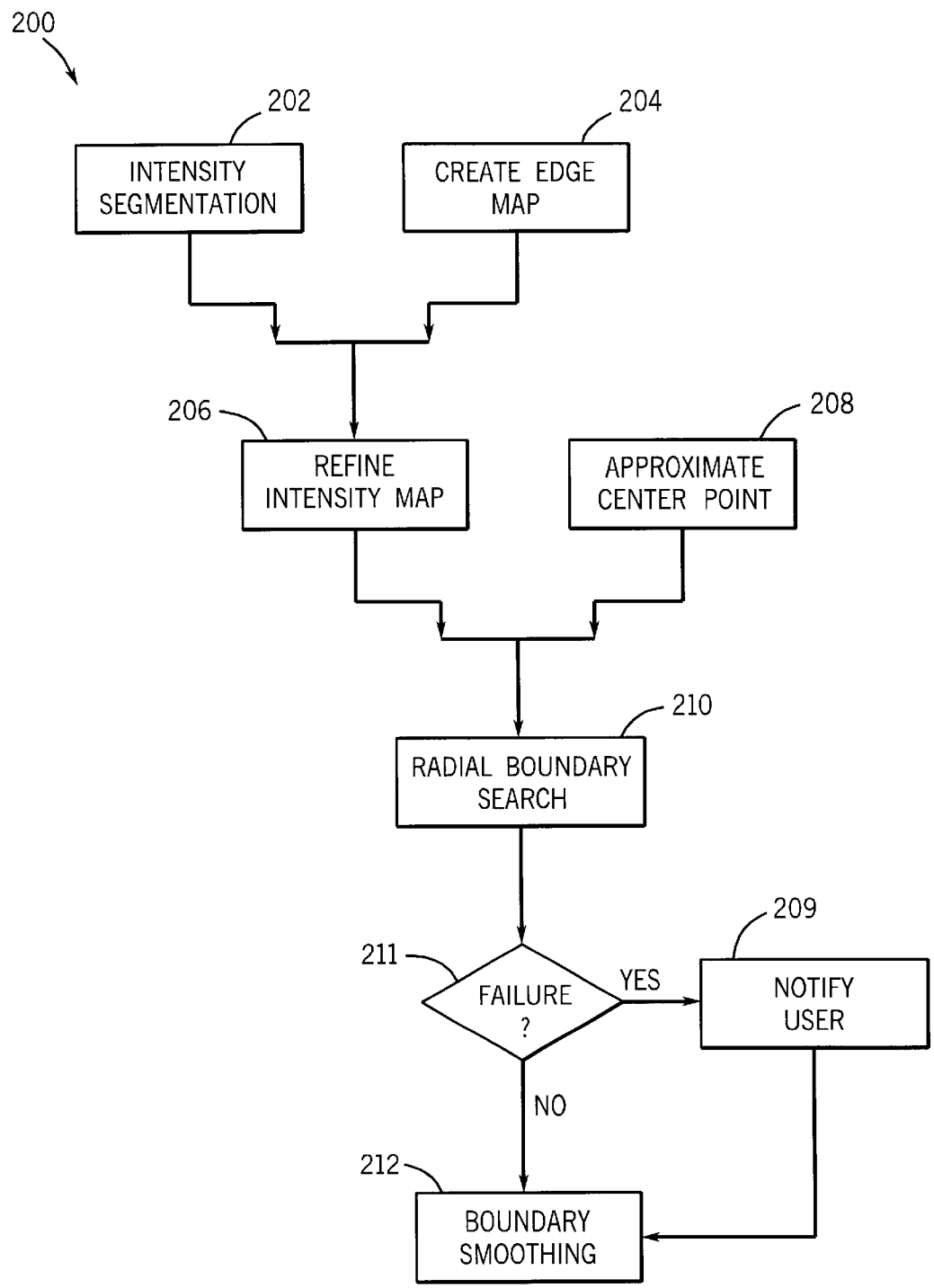
FIG. 3 is a flow chart of the steps performed with the MRI system to carry out the preferred embodiment.
Figure 4:
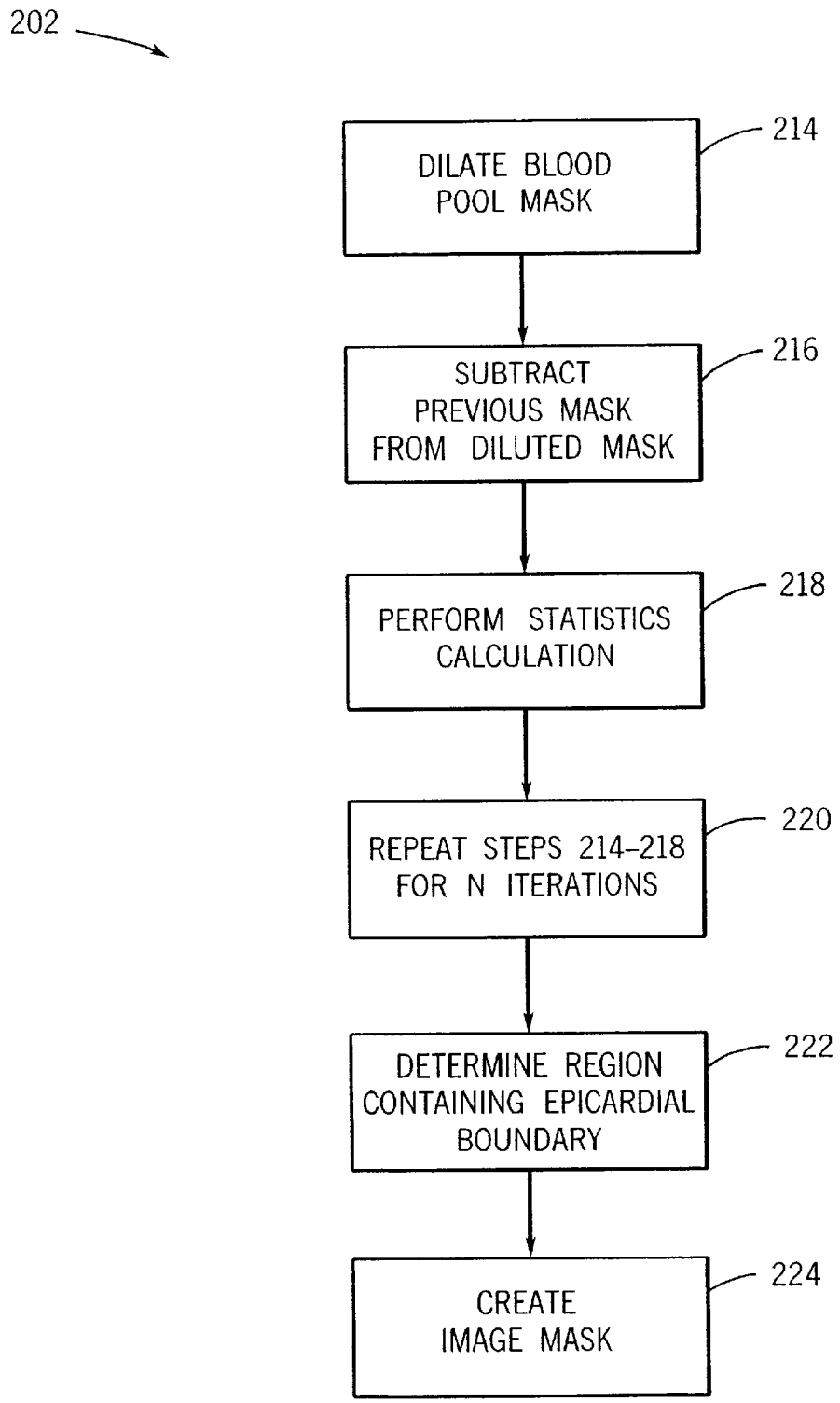
FIG. 4 is a flow chart of the steps performed to carry out the intensity segmentation process that forms part of the method of FIG. 3.

Referring now to FIG. 3, an epicardial detection process 200 is performed on the acquired image data by the image processor 106. The first step indicated at process block 202 determines a pixel intensity range in the image for the muscle comprising the left ventricle. This intensity segmentation process 202 is illustrated in more detail in FIG. 4, which begins at step 214 using the blood pool mask 228 illustrated in FIG. 6. It should be appreciated that the mask 228 could be generated by the user or produced using another segmentation algorithm. The blood pool mask 228, as illustrated, is defined by a rectilinear grid 230 having shaded pixels 232 that are turned "on" to represent the structure of interest (blood pool), and clear pixels 234 that are turned "off" to represent space not occupied by the blood pool. Next, at step 214, the blood pool mask 228 is dilated, using a morphological operator that defines a method for expanding a binary mask, and is defined by the following equation:

$$X \oplus B = \{x : B_x \cap X \neq \phi\} \quad (3)$$

where X is the image; B is a structuring element represented by kernel 236 illustrated in FIG. 5; $B_x$ is the translation of B such that its origin is at x; and x is a specific pixel. The structuring element B is moved across the blood pool mask 228. When a pixel 238 in B is "on" and the corresponding pixel in the image mask is "on," (232) then the pixel in the blood pool mask 228 corresponding to the center of B 240 is turned "on." FIG. 7 illustrates a mask 242 of the blood pool mask 228 once dilated, and having an outer boundary 244 surrounding the image 232.

Figures 7, 8:
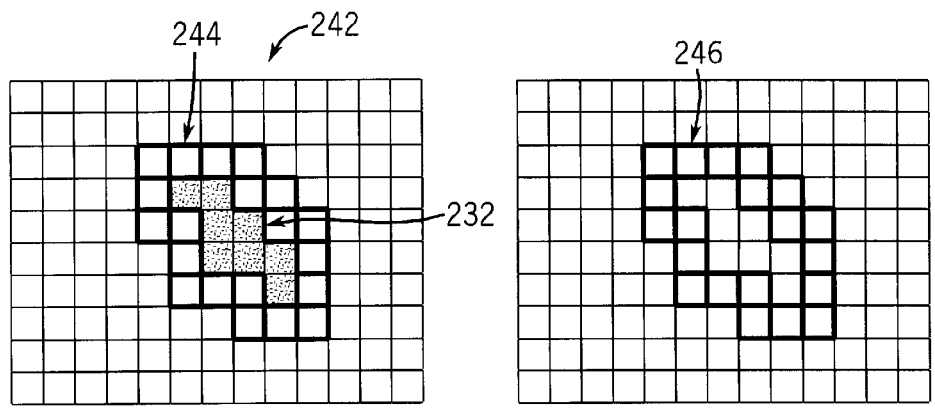
FIG. 7 is the blood pool mask of FIG. 6 once dilated in accordance with the preferred embodiment.
FIG. 8 is a dilation mask obtained by the subtraction of the mask illustrated in FIG. 6 from the mask illustrated in FIG. 7.

Once the original blood pool mask 228 has been dilated, the blood pool mask 228 is subtracted from the dilated mask 242 at step 216 to produce a one-pixel wide boundary 246 illustrated in FIG. 8. The subtraction is defined by the following operation:

$$X_n - X_{n-1} \equiv \{x : X_n \cap X_{n-1} = \phi\} \quad (4)$$

where $X_n$ is the blood pool mask dilated n times, and $X_{n-1}$ is the blood pool mask dilated n−1 times. The boundary 246 therefore represents the advancing boundary of the dilated mask 242 as shown in FIG. 8.

The intensity segmentation process 202 then continues at step 218 and performs a statistics calculation of the $\bar{x}$ dilation boundary 246. In particular, first order statistics are calculated for the dilation boundary 246. The mean of the sample is defined by the equation:

$$\bar{x} = \frac{1}{n} \sum_{i=1}^{n} x_i \quad (5)$$

where n is the number of pixels defining the dilation boundary 246; and $x_i$ is the intensity of a pixel in the dilation boundary. The standard deviation metric SD of the intensity of the sample is defined by the equations:

$$\bar{v} = \frac{1}{n-1} \sum_{i=1}^{n} (x_i - \bar{x})^2 \quad (6)$$

See A. Papoulis, "Probability, Random Variables, and Stochastic Processes," (Third Edition), New York, NY: McGraw Hill, Inc. (1991), citing equations (5) and (6), and $$SD = \sqrt{\bar{v}} \quad (7)$$

where $\bar{v}$ is variance. At step 220, the intensity segmentation process repeats steps 214–218 to once again dilate the once dilated mask 242, perform the subtraction of the previous mask from the newly dilated mask, and finally perform the statistics calculation. These dilation iterations are performed N times, where N is chosen to be sufficiently large to ensure that the dilation boundary 246 grows beyond the epicardium 182 and into the areas surrounding the heart 169. Thus, N depends primarily on the field of view of the image. If the field of view is small, resulting in the heart occupying a large portion of the image, N would increase. If, however, the field of view is large, resulting in the heart occupying a smaller portion of the image, N may be decreased to save computation time. N is set to 15 in accordance with the preferred embodiment.

Figure 9:
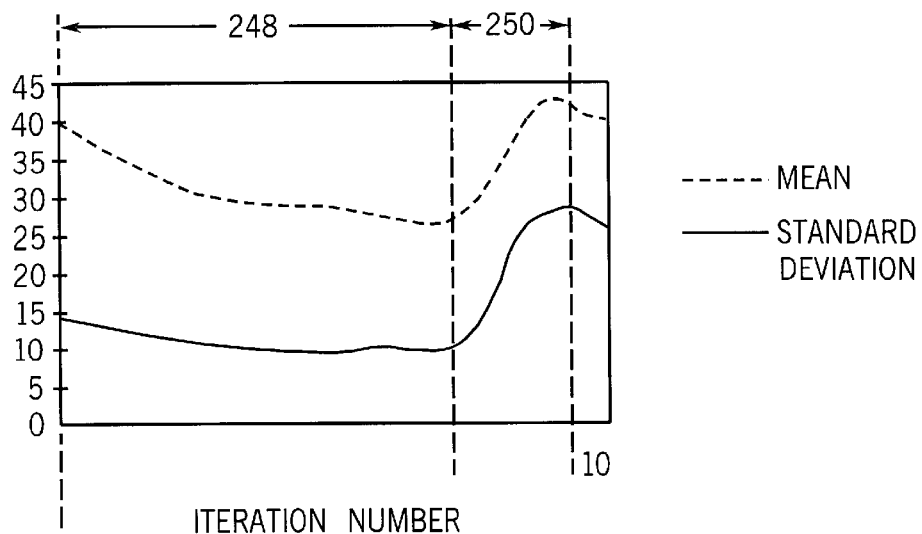
FIG. 9 is a graph of the mean and standard deviations plotted against the natural log of the corresponding dilation iteration number in accordance with the preferred embodiment.

Because it is desirable to calculate an intensity map (as described below) which includes the left ventricle 172 and excludes as many surrounding areas as possible, it is of interest to calculate the statistics indicative of the point at which the boundary 246 has moved beyond the epicardium 182. Therefore, once N is satisfied, the intensity segmentation process 202 proceeds to step 222, where the point at which the outer boundary 246 crosses the outer wall of the left ventricle 172 is determined. As this occurs, the boundary 246 will encounter vastly differing pixel intensities, which are the result of the different tissue compositions of the regions beyond the heart 169, for example the lungs and the diaphragm (not shown). FIG. 9 illustrates a graph of the mean and standard deviation of intensity values corresponding to the boundary 246 plotted against the natural log of the iteration number. As illustrated, as the boundary 246 advances from the endocardium, the standard deviation gradually decreases, as indicated in FIG. 9 at 248, until the boundary 246 begins to reach the epicardium 182. At this point, the standard deviation begins to increase significantly, as indicated in FIG. 9 at 250. The standard deviation then begins to decrease once again as the boundary 246 moves away from the epicardium 182 and begins to move through more homogeneous materials. The boundary 246 defined by the maximum change in standard deviation yields a good approximation of the region containing the epicardial boundary, and is defined by the following equation:

$$\Delta SD_n = \left| \frac{SD_n - SD_{n-1}}{\ln(n) - \ln(n-1)} \right| \quad (8)$$

where $SD_n$ is the standard deviation metric for n; and $SD_{n-1}$ is the standard deviation for iteration n−1.

Figures 10, 11:
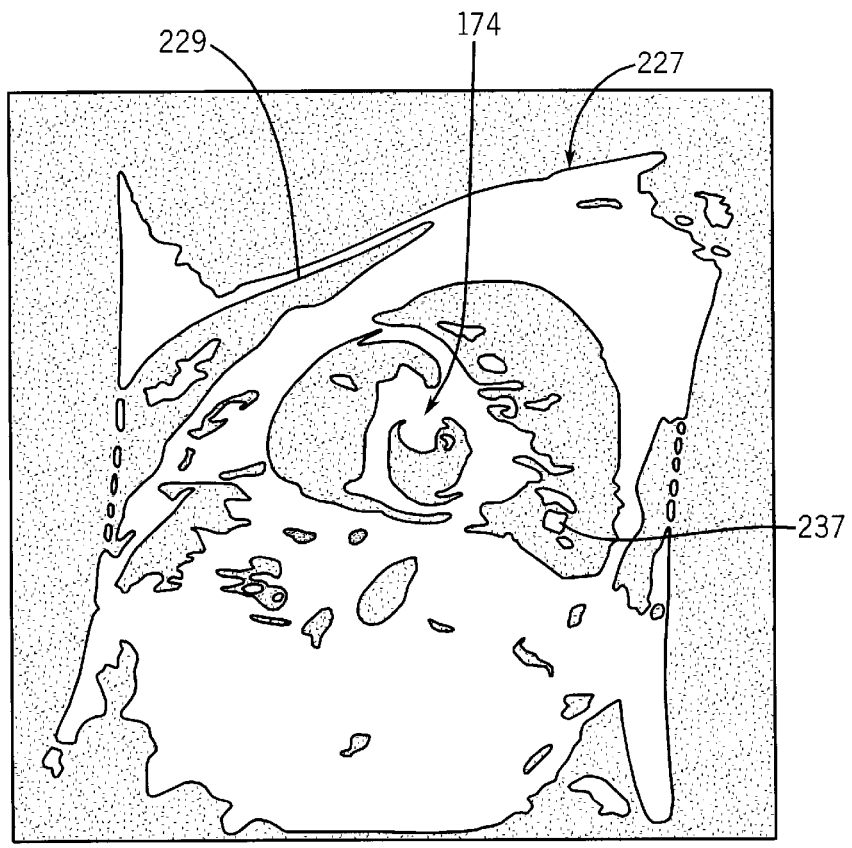
FIG. 10 is an intensity map in accordance with the preferred embodiment.
FIG. 11 is a diagram of a plurality of compass operators used in conjunction with the "create edge map" step of FIG. 7.

The statistical data from the iteration having the largest $\Delta SD$ are used to calculate the intensity range for an intensity map 227, as illustrated in FIG. 10.

The intensity segmentation process is completed at step 224, whereby the intensity map 227 is defined by the following equation:

$$M \equiv \{p : SD - \alpha \bar{x} \leq I(p) \leq SD + \beta \bar{x}\} \quad (9)$$

where p is a specific pixel; I(p) is the intensity of p; SD is the standard deviation from equation (7); x is the sample mean from equation 6; and $\alpha$ and $\beta$ are constants. In accordance with the preferred embodiment, $\alpha$ and $\beta$ are empirically derived to yield a map having a predetermined intensity range. The intensity map 227 as illustrated in FIG. 10 contains a blood pool 174, edges 229, and islands 237.

The intensity map 227 that was produced by the intensity segmentation block 202 represents an image having a plurality of "off" and "on" pixels representing non-mask values and mask values, respectively, according to whether a given portion of the MR image meets the intensity threshold requirements of the intensity segmentation block 202. Some of the "on pixels" in the mask will define the left ventricular epicardial boundary while others define images such as the blood pool 174, edges 229 and islands 237. Accordingly, once the intensity map 227 is refined to produce a classification map lacking the blood pool 174, edges 229, and islands 237, boundary points that define the epicardial boundary will be detected based on the remaining "on" pixels, as will be described below.

Figure 12:
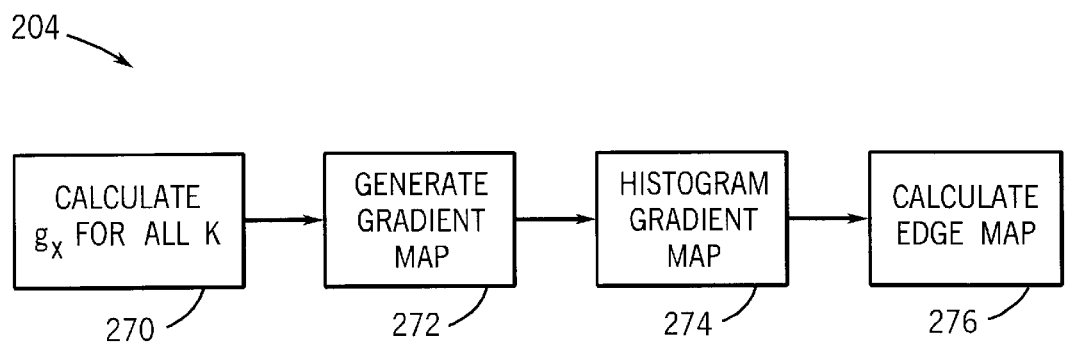
FIG. 12 is a flow chart of the process performed to carry out the "create edge map" step that forms part of the method of FIG. 3.

Referring again to FIG. 3, the epicardial detection process 200 next generates a one-pixel wide edge map for the image at step 204 using a plurality of compass operators on the input image data. Compass operators are functions which measure gradients in intensity for a selected number of directions, and were chosen in accordance with the preferred embodiment due, in part, to their low computational requirements. Step 204 is illustrated in detail in FIG. 12 in which the first step 270 calculates the intensity gradient at a given location (m,n) as defined by the following equation:

$$g(m,n) \equiv \max_k \{|g_k(m,n)|\} \quad (10)$$

where $g_k(m,n)$ is the compass operation in the direction $\theta_k$ for k=0, . . . 7; and $\theta_k$ is the gradient direction for a given compass operator. The compass operators can be calculated from a weighted average of the pixel values in the acquired image. A full set of compass operators can be represented by the following kernels 254, 256, 258, 260, 262, 264, 266, and 268 representing kernels positioned north, northwest, west, southwest, south, southeast, east, and northeast, respectively, as shown in FIG. 11. It can be observed that pixel values are positive in the direction representing the overall position of the kernel, negative in the direction opposite that representing the kernel separated by pixels of 0. For example, kernel 254 includes positive pixels in the north direction, negative kernels in the south, separated by a row of kernels of 0.

The values of the elements of each kernel are used as multiplicative weights for the pixels in the neighborhood of interest to determine the gradients in each direction. After $g_k$ is calculated for all k at a given pixel at step 270, the maximum value of $g_k$ is used to represent the gradient at that pixel. A gradient map is then calculated for the entire image at step 272. The intensity values of the gradient map are histogrammed at step 274. To generate the edge map at step 276, a gradient threshold is selected whereby all values in the gradient map falling below the designated threshold are ignored. The gradient threshold is adjustable, and is set to 20% in the preferred embodiment, thereby retaining those pixels having intensity values falling within the top 20%, and discarding the remaining 80% of the pixels. The gradient values which remain after the thresholding step are defined to be the edge map corresponding to the edges 229 in the intensity map 227.

Figure 13:
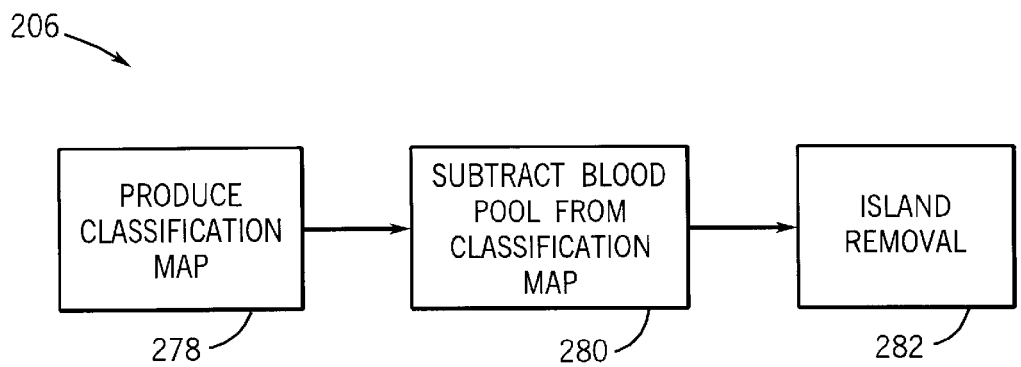
FIG. 13 is a flow chart of the process performed to carry out the "refine intensity map" step in the method of FIG. 3.

Referring again to FIG. 3, once the intensity and edge maps are created, the epicardial detection process 200 refines the intensity map 227 at step 206. As shown in more detail in FIG. 13, the intensity map 227 defines the areas that contain pixels in the intensity range of interest. The edge map defines strong edges in the image, some of which likely defining the epicardial boundary. The intensity map 227 and edge map are combined by subtracting the edge map from the intensity map to produce a classification map (not shown) at step 278. The subtraction is performed according to the technique described above with reference to Equation 4.

The classification map therefore defines the areas of proper intensity, with edges 229 of interest being cut out of the intensity map 227. To further refine the classification map, the first dilation of the blood pool mask 228 is subtracted from a classification mask (corresponding to the classification map) at step 280 to produce a classification map with the blood pool 174 removed. Subtracting the blood pool mask 228 removes stray pixels in the blood pool 174 which may have been in the intensity range of the epicardium 182, as a pixel cannot be a member of both the blood pool and the epicardium.

Figure 14:
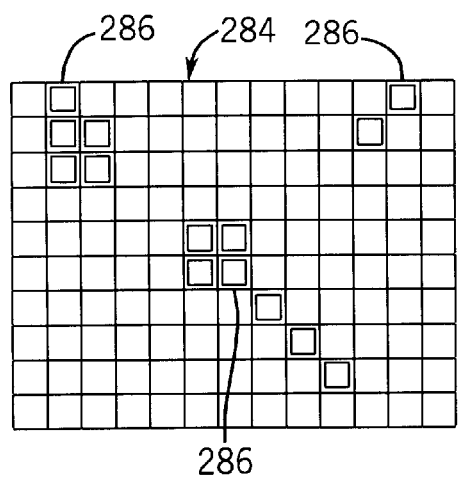
FIG. 14 is a mask representing an image containing islands in accordance with the preferred embodiment.
Figure 15:
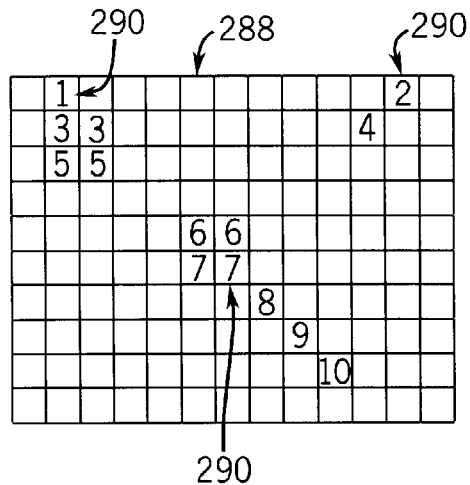
FIG. 15 is a mask corresponding to FIG. 14 with the "on" pixels labeled.
Figure 16:
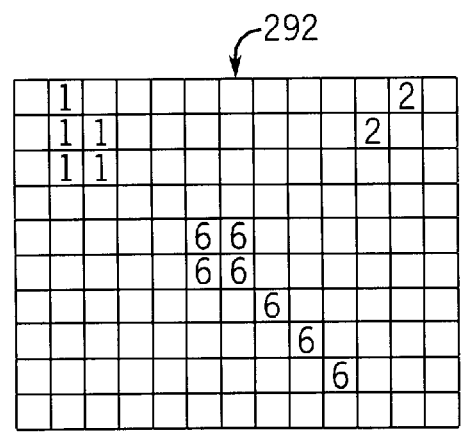
FIG. 16 is a mask corresponding to FIG. 15 with the islands joined.
Figure 17:
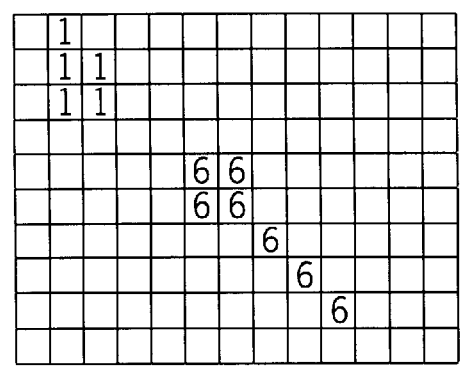
FIG. 17 is a mask corresponding to FIG. 16 with the island removal process completed in accordance with the preferred embodiment.
Figure 18:
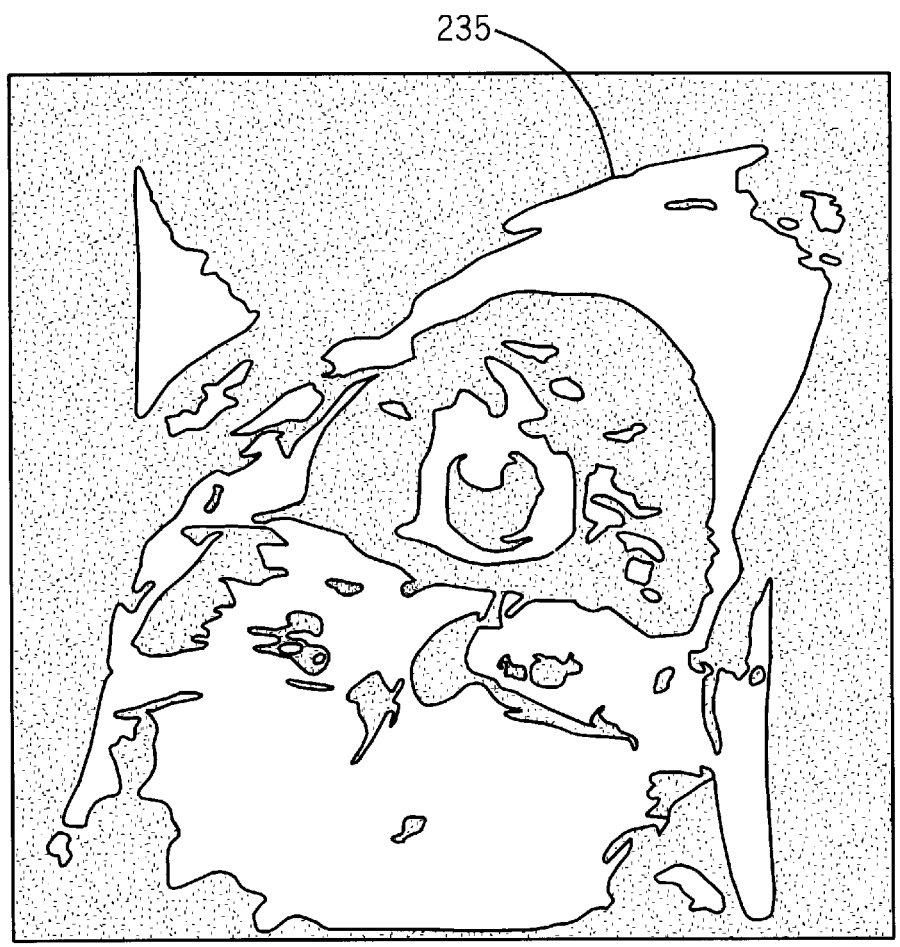
FIG. 18 is the intensity map of FIG. 10 having the edges, islands, and blood pool removed in accordance with the preferred embodiment.

Next, with continuing reference to FIG. 3, an island removal process is performed at step 282, whereby small groups of pixels are removed to reduce noise in the mask and to increase the probability of choosing a correct epicardial boundary. Such groups of pixels, or "islands," are illustrated in FIG. 10 at 237. The island removal process 282 is an iterative process which employs the mask 284 of FIG. 14 and identifies areas of structure ("on" pixels) 286. In particular, the mask 284 is scanned from left to right in each row, starting with the upper left corner. Each non-adjacent "on" pixel 286 is labeled with successive numbers to produce a labeled image 288, as illustrated in FIG. 15. The labels are then merged, as shown in FIG. 16, by scanning the labeled image 288 and joining pixels that are connected. For example, when scanning the labeled image 288, the first value encountered in the first row is a "1". Connected to that pixel labeled "1"are two other pixels labeled "3". The pixels labeled "3"are replaced with "1"since they are connected. A "merged labels" image 292, illustrated in FIG. 16, is produced as a result of merging and labeling all of the islands 290 in the labeled image 288. Finally, the island removal process histograms and thresholds the image 292. If an island does not include enough labeled pixels (i.e. the island's pixel count value is not above a predetermined threshold), all pixels in that island are turned off. The threshold should be set so as to remove those islands which are small enough to be properly attributable to noise while retaining those that are representative of anatomy, and is set to 50 in accordance with the preferred embodiment. In the illustrated example, in FIG. 16, because the island labeled "2"did not meet the threshold, the pixels corresponding to that island have been turned "off" in FIG. 17. FIG. 18 illustrates a final classification map 235 after the edges 229, blood pool 174, and islands 237 have been removed.

Referring again to FIG. 3, once the intensity map is refined at step 206, the epicardial detection process 200 executes step 208 to approximate the center point of the left ventricle using the blood pool mask 228. The following mass equations are used to calculate the center of the blood pool 174:

$$x_c = \frac{1}{M} \int_R \int x \rho(x, y) dA \quad (11)$$

$$y_c = \frac{1}{M} \int_R \int y \rho(x, y) dA \quad (12)$$

where $x_c$ is the x coordinate of the center point; $y_c$ is the y coordinate of the center point; R is the region of interest; $\rho(x,y)$ is the density function; dA is an element of infinitesimal area; and M is the total mass, as defined by:

$$M \equiv \int_R \int \rho(x, y) dA \quad (13)$$

Figure 19:
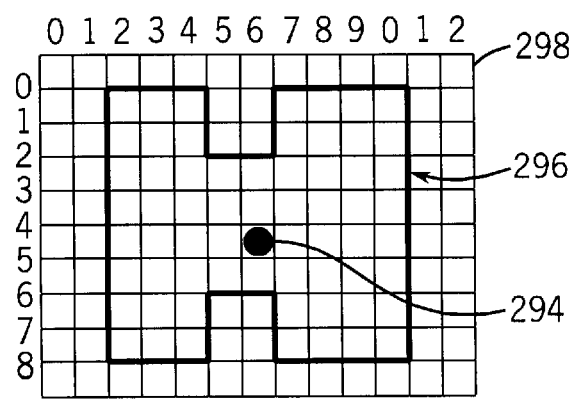
FIG. 19 is a graphical representation illustrating a center of mass calculation in accordance with the preferred embodiment.

To find the center of the blood pool 174, R is taken to be the blood pool mask. Because all pixels in the blood pool mask 228 are of equal value, $\rho(x,y)$ can be taken as 1 to indicate constant density. M therefore reduces to the total area of the blood pool 174. Using these simplifications, and recognizing that the image data is represented as discrete pixel values, equations (12) and (13) may be rewritten, respectively, as:

$$y_c = \frac{1}{N} \sum_y \sum_x y \quad (14)$$

$$x_c = \frac{1}{N} \sum_y \sum_x x \quad (15)$$

where N is the number of pixels in the blood pool mask 228. It should be appreciated that equations (14) and (15) are simply the average values for x and y, respectively, for the points contained in the blood pool mask 228. FIG. 19 illustrates an example calculation of center of mass 294 ($x_c, y_c$)for an object 296 outlined in Cartesian space, having grid lines 298 representative of pixel location. In the illustrated example, $x_c$=6.025 (388/64), and $y_c$=5.0625 (324/64).

Figure 21:
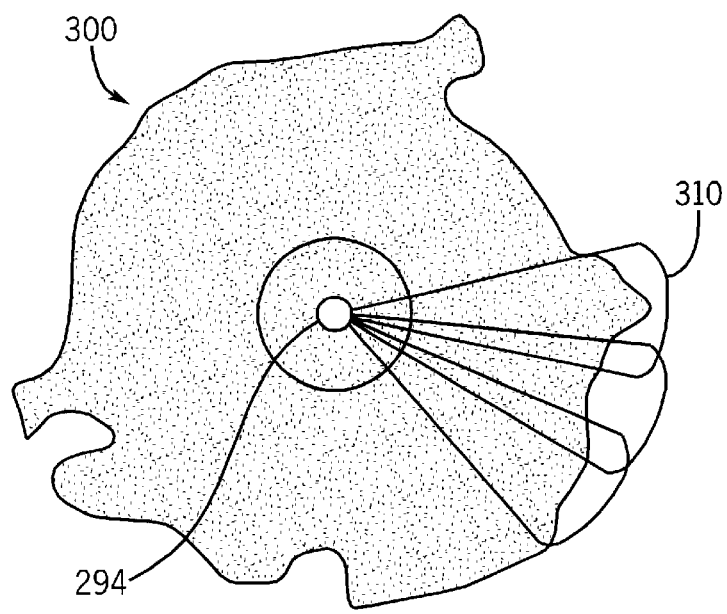
FIG. 21 is an illustration of the boundary smoothing process of an epicardial boundary in accordance with the preferred embodiment.

Referring again to FIG. 3, the calculated center point 294 is used with the intensity map 227 to find an approximate epicardial boundary in a radial boundary search process 210. As shown in FIG. 21, rays (not shown) are cast radially outwardly from the center point 294 in search of a transition from a first non-mask intensity value to a mask intensity value, and then back to a second non-mask intensity value. The first non-mask value is representative of the rays traversing the location formerly occupied by the blood pool 174; the mask-value is representative of the rays crossing the myocardium; and the second non-mask value is representative of the rays crossing the epicardium 182. Because the edges 229 have been removed during step 206, many areas of the epicardium 182 are sufficiently defined. In some areas, however, where no strong edge was present and the intensity range is therefore that of the myocardium, a reliable approximation of the epicardial boundary 300 may not exist. In this case, the search will fail at decision block 211, and the radial value stored for the search will be the final distance at which the search was attempted. A direct correlation exists between the number of radii having no reliable definition of the corresponding epicardial boundary 300 and the successful completion of the epicardial detection process 200. The ability to detect failure, therefore, is particularly useful when providing a completely automated segmentation of a dataset. The failure may be communicated to the user at step 209 so that particular attention may be given to reviewing those images identified as having a failed boundary. Therefore, even though a failure may have been detected, the epicardial detection process 200 will proceed after notifying the user of the failure, as will now be described.

Figure 20:
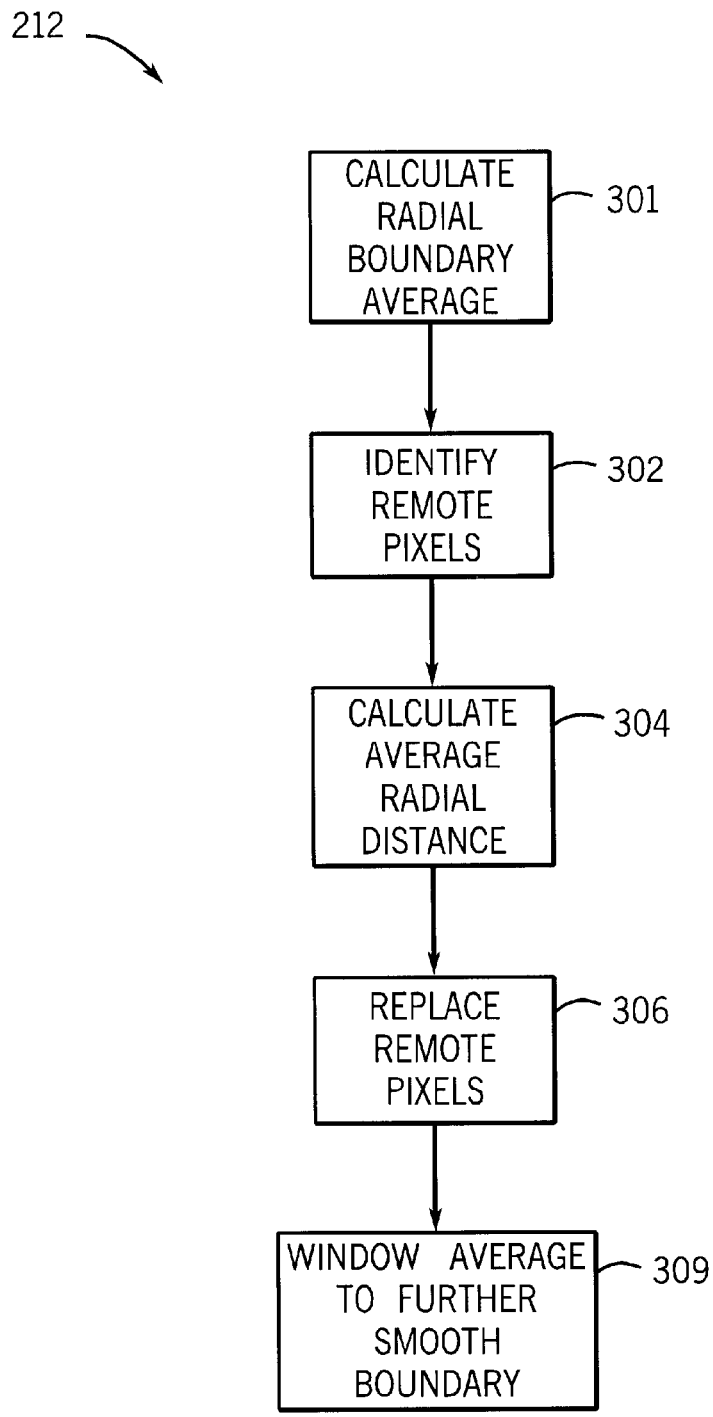
FIG. 20 is a flow chart of the process performed to carry out the boundary smoothing step in the method of FIG. 3.
Figure 22:
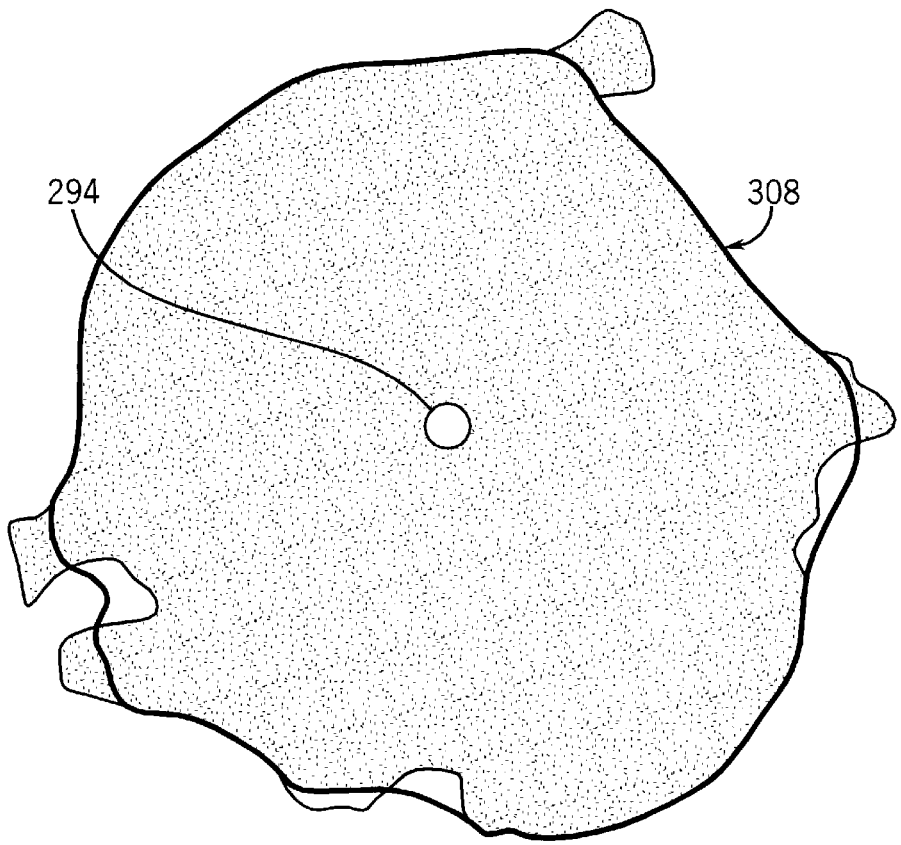
FIG. 22 is the boundary of FIG. 21 with the boundary smoothing process completed.

Once the epicardial boundary points 300 are determined, and after any failures have been communicated to the user, a boundary smoothing process 212 is performed to transform the boundary points into a smooth closed curve 308 as illustrated in FIG. 22. The boundary smoothing process 212 is illustrated in detail in FIG. 20 and begins at step 302, where any points having a small probability of actually being on or near the epicardial boundary are discarded, as defined by a thresholding operation:

$$\hat{R} \equiv \left\{ r : \begin{cases} (1-\gamma)*r_{ave} \leq r \leq (1+\gamma)*r_{ave} \\ r_{ave2} \quad \text{otherwise} \end{cases} \right\} \quad (16)$$

where $\hat{R}$ is the set of all radii defining an estimate of the epicardial boundary; r is a specific radius; $r_{ave}$ is the average value of all radii prior to thresholding; $r_{ave2}$ is the average value of all radii within the threshold; and γ is the threshold coefficient. Once all radii exceeding the threshold have been removed, the new radial average ($r_{ave2}$) is calculated at step 304, and radii exceeding the threshold are replaced with $r_{ave2}$ at step 306. The boundary smoothing process 212 thereby produces a set of boundary points 300 having corresponding radii that are all within the empirically derived threshold. Once the refined estimate of the boundary points 300 is obtained, the radii values are further smoothed at step 309 to obtain a smooth, closed curve 308 representing the epicardial boundary using a window averaging technique.

Figure 24:
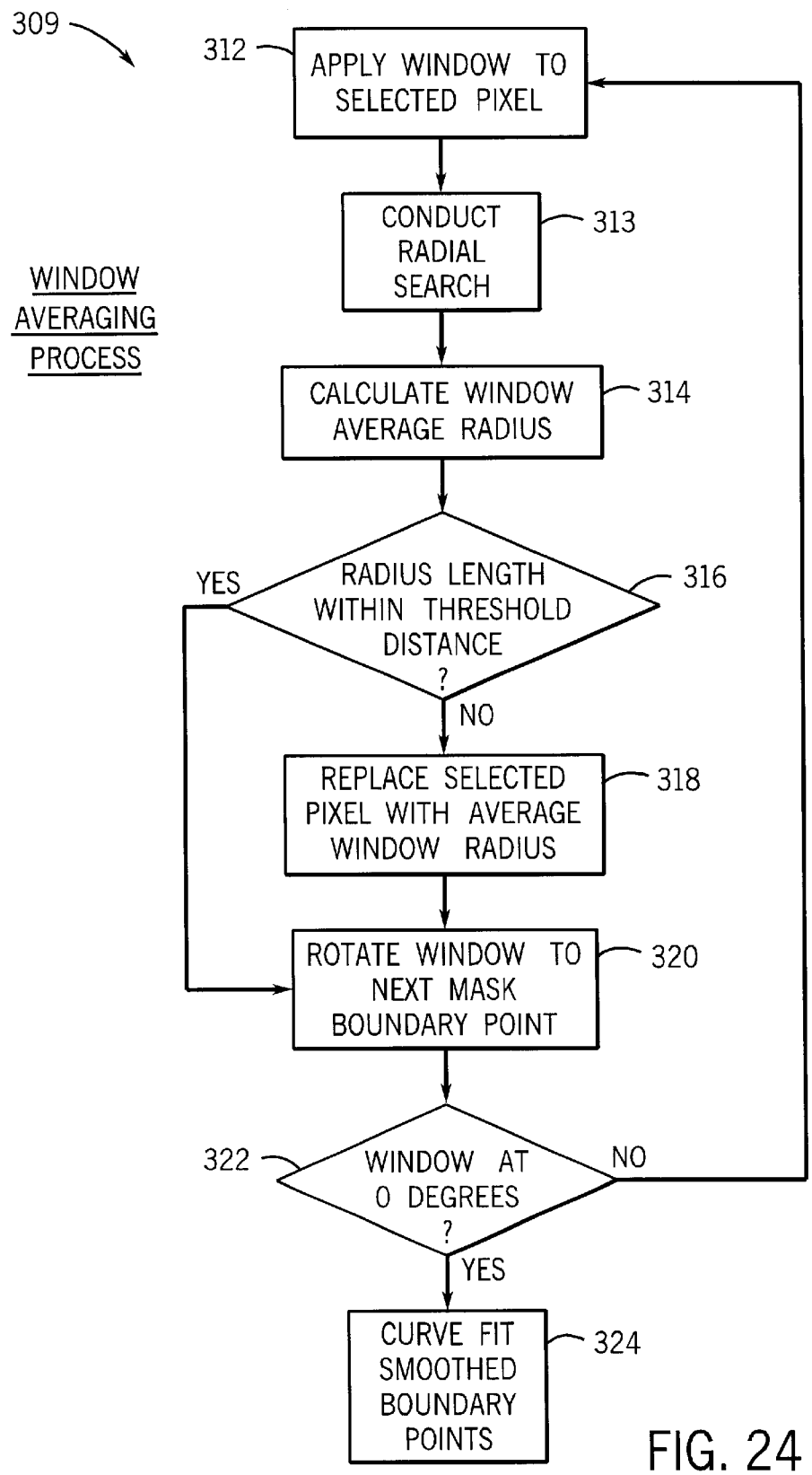
FIG. 24 is a flow chart of the process performed to carry out the window averaging step of FIG. 20 in accordance with the preferred embodiment.

Referring now to FIGS. 21 and 24, the window averaging process 309 begins at step 312, where a window 310 is applied to a particular radius at step 312, and encompasses a plurality of surrounding radii that comprise the refined boundary 300. The window iteratively rotates radially about the center 294 until the entire boundary 300 has been smoothed. The radial orientation of the window is initially set to the 0° location, and the angle of the window is predetermined so as to encompass a predetermined number of radii at each iteration. The average length of all radii falling within the window at a given point in time is calculated at step 314, and an interval is empirically derived so as to define an acceptable range above and below the calculated average. The length of the particular radius under examination is compared to the calculated average at decision block 316. If the length falls within the interval surrounding the calculated average, then the process 309 will continue to step 320 and rotate the window to examine the next radius in succession. If, however, the length falls outside of the interval surrounding the calculated average, then the length of that radius will be replaced with the calculated window average at step 318 before rotating the window at step 320.

Once window 310 is rotated to the next radius at step 320, it is determined at decision block 322 whether the window has rotated again to the 0° location, thereby signifying completion of a 360° revolution about the center point 294. If a complete revolution has not yet been completed, steps 312–320 are repeated until decision block 322 determines that all radii have been examined and modified, if necessary. As illustrated in FIG. 22, once the window has returned to the 0° position, a smooth closed contour 308 is produced.

It should be appreciated that the threshold coefficient γ in Equation (16) may be decreased to produce a smoother curve incorporating a more refined approximation of the boundary 300. Alternatively, the increasing the coefficient γ will yield a more accurate representation of the boundary 300 that was determined above.

Figure 23:
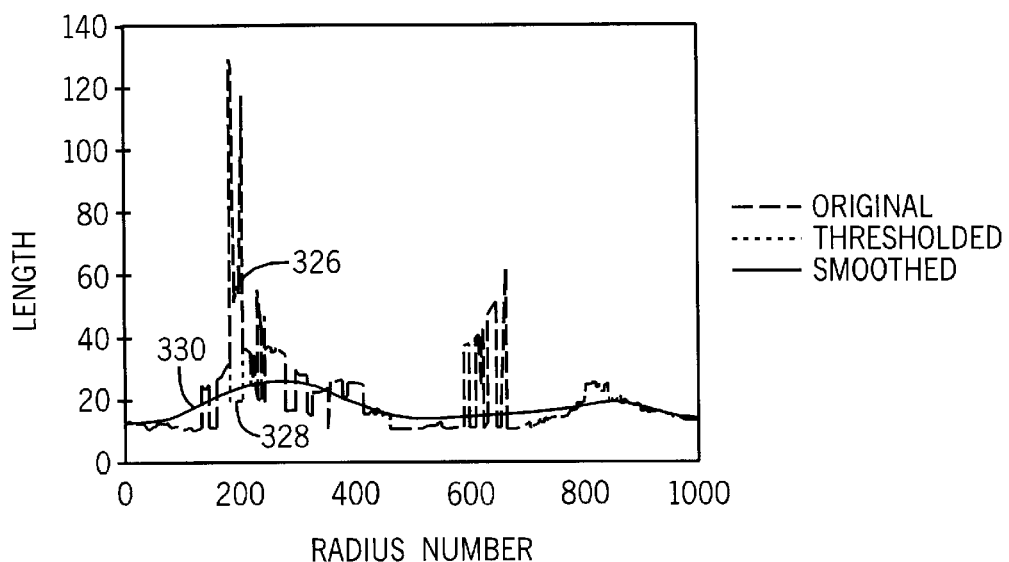
FIG. 23 is a graphical representation of the smoothing effects on actual radii data in accordance with the preferred embodiment.

The effects of the boundary smoothing process 212 and window averaging process 309 is illustrated with reference to FIG. 23, which depicts curve representing original radii lengths 326 that are thresholded to produce curve 328, and that are subsequently smoothed to produce curve 330, as described above.

It should be appreciated that the above described epicardial detection process 200, while generally illustrated to segment a left ventricular epicardium in MR images, may also be used to segment cardiac images acquired with other imaging modalities such as x-ray, x-ray CT, ultrasound, and nuclear. Indeed, the above described technique may be expanded to segment other bodily organs. Accordingly, the present invention is not intended to be limited to fitting a smooth boundary to a segmentation mask of a left ventricular epicardial boundary.

While the steps performed in accordance with the preferred embodiment have been described, alternate embodiments may be implemented to improve the epicardial detection process 200. In particular, factors such as speed and memory conservation are desirable for use in a clinical setting. This may be achieved by 1) combining the dilation and statistics calculation steps 214 and 218, 2) simplifying the edge detection process 204, and 3) reducing the number of floating point calculations.

The dilation and statistics calculation steps 214 and 218 may be improved by calculating the statistics during the dilation step. Calculating the statistics for each dilation iteration while the $\bar{x}$ dilation kernel is moving through the image foregoes the need for additional passes through the image. Calculation of the mean $\bar{x}$ may also be expedited by summing the values of each pixel added by the dilation kernel 236. Once the dilation kernel 236 has passed completely through the image 228, the only additional step necessary to calculate the mean $\bar{x}$ is to divide the sum of the added pixels by the number of added pixels.

To increase the speed of calculating the standard deviation metric SD, Equation 6 may be rearranged to allow partial terms of the variance $\overline{V}$ to be calculated as follows:

$$\overline{V} = \frac{1}{n-1}\left[\sum_{i=1}^{n} x_i^2 - 2\overline{x}\sum_{i=1}^{n} x_i + n\overline{x}^2\right] \qquad (17)$$

Equation 17 provides a way to calculate the variance during the dilation, or "on the fly." Specifically, the first term is calculated by summing the squares of the pixel values for each pixel added by the dilation kernel 236. The second term is twice the mean $\overline{x}$ after the dilation kernel 236 has passed completely through the image 228. The final term is calculated after $\overline{x}$ the dilation is complete by squaring the mean and multiplying by the pixel counter used to compute the mean.

Because the statistics are being calculated on the fly, it is not necessary to store copies of the dilated masks 242 for later statistics calculations. However, a dilated blood pool is still needed later in the process to clean up the binary pixel mask. Therefore, in the dilation process, rather than adding every dilated pixel with the same intensity value in the dilation mask 242, a pixel value may be used which is related to the iteration number. For example, the original blood pool mask 228 may be stored with a value of 1, with the values incrementing by 1 as successive iterations are performed. Accordingly, the results of all dilations may be stored in one image mask for future access while conserving memory space.

The edge detection process 204 may also be modified to increase the speed of the epicardial detection process 200. For example, a mere sign difference separates those compass operators indicating north 254 and those indicating south 262. Because only the magnitude of the operators is used when calculating the edge map, only one of the operators need be used. The result is a reduction of the number operators needed to calculate the edge map by a factor of two. Additionally, because the compass operators rotated at 45° (256, 260, 264, and 268) provide little additional information, they may be eliminated altogether. While this step does minimally decrease the accuracy of the edge map, it provides benefits in time conservation. Accordingly, only two compass operators need to be used—one along the north-south direction, and one along the east-west direction.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

What is claimed is:

1. A method for smoothing an image produced with a magnetic resonance imaging system, wherein the image is defined by an initial plurality of boundary points, each said initial boundary point having a corresponding radius, the method comprising:

removing each said radius having a length that falls outside a first predetermined interval so as to produce a second plurality of radii emanating from a common central location whose corresponding lengths fall within said first predetermined interval, wherein said second plurality of radii define a plurality of remaining boundary points;

encapsulating a portion of said second plurality of radii with a moving window;

examining each of the portion of said second plurality of radii to determine those radii within said portion of second radii having lengths outside a second interval, and adjusting the lengths of those radii such that said adjusted length falls within said second predetermined interval;

iteratively rotating said moving window about said central location so as to examine each radius within said second plurality of radii; and curve fitting said remaining boundary points so as to produce a smooth, closed curve representing said image.

2. The method as recited in claim 1, wherein said second plurality of radii is defined by the equation $$\hat{R} \equiv \left\{ r : \begin{cases} (1-\gamma)*r_{ave} \le r \le (1+\gamma)*r_{ave} \\ r_{ave2} \quad \text{otherwise} \end{cases} \right\}$$

wherein $\hat{R}$ defines a set of said second plurality of radii;

r defines a range of said lengths defining said second plurality of radii;

$r_{ave}$ is an average value of all radii defining said initial boundary points;

$r_{ave2}$ is an average value of all radii within said second plurality of radii; and $\gamma$ is a threshold coefficient.

3. The method of claim 1, further comprising calculating an average of the lengths of said second plurality of radii, wherein said second predetermined interval defines a range about said calculated average.

4. The method of claim 1, wherein said image is a binary mask having a plurality of pixels representing a magnetic resonance image of a left ventricular epicardial boundary.

5. A boundary smoothing system for smoothing an image produced with a magnetic resonance imaging system, wherein the image is defined by a plurality of boundary points defined by a corresponding first plurality of radii, the system comprising:

means for removing a portion of said first plurality of radii having corresponding length that are outside a first predetermined interval so as to produce a second plurality of radii emanating from a common central location;

means for encapsulating a portion of said second plurality of radii and for rotating a window about said central location so as to examine each radius within said second plurality of radii;

means for determining whether the length of a radius within said portion of said second plurality of radii is outside a second interval; and means for adjusting adjusting said length such that said adjusted length is within said second predetermined interval.

6. The system as recited in claim 5, wherein said length of said radius is adjusted if said length is outside said second interval.

7. The system of claim 6, further comprising means for calculating an average of the lengths of said second plurality of radii, wherein said second predetermined interval defines a range about said calculated average.

8. The system as recited in claim 5, wherein said second plurality of radii is defined by the equation $$\hat{R} \equiv \left\{ r : \begin{cases} (1-\gamma)*r_{ave} \leq r \leq (1+\gamma)*r_{ave} \\ r_{ave2} \quad \text{otherwise} \end{cases} \right\}$$

wherein $\hat{R}$ defines a set of said second plurality of radii;

r defines a range of said lengths defining said second plurality of radii;

$r_{ave}$ is an average value of all radii defining said initial boundary points;

$r_{ave2}$ is an average value of all radii within said second plurality of radii; and $\gamma$ is a threshold coefficient.

9. The system of claim 5, further comprising means for curve-fitting said plurality of boundary points so as to produce a closed curve.

10. The system of claim 5, wherein said image is a binary mask, and said boundary points are defined by a corresponding plurality of pixels.

11. The system of claim 10, wherein said binary mask represents a magnetic resonance image of a left ventricular epicardial boundary.

* * * * *

UNITED STATES PATENT AND TRADEMARK OFFICE
CERTIFICATE OF CORRECTION

PATENT NO. : 6,771,803 B1
DATED : August 3, 2004
INVENTOR(S) : Matthew W. Turek et al.

It is certified that error appears in the above-identified patent and that said Letters Patent is hereby corrected as shown below:

<u>Column 1,</u>
Line 21, "emited" should be -- emitted --.

Signed and Sealed this

Twelfth Day of October, 2004

JON W. DUDAS
*Director of the United States Patent and Trademark Office*